US010737241B2

(12) United States Patent
Furudate et al.

(10) Patent No.: US 10,737,241 B2
(45) Date of Patent: *Aug. 11, 2020

(54) PHOTOCATALYST/ALLOY FINE-PARTICLE DISPERSION HAVING ANITBACTERIAL/ANTIFUNGAL PROPERTIES, METHOD OF PREPARATION THEREOF, AND MEMBER HAVING PHOTOCATALYST/ALLOY THIN FILM ON SURFACE

(71) Applicant: Shin-Etsu Chemical Co., Ltd., Tokyo (JP)

(72) Inventors: Manabu Furudate, Kamisu (JP); Tomohiro Inoue, Kamisu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 24 days.

This patent is subject to a terminal disclaimer.

(21) Appl. No.: 16/144,167

(22) Filed: Sep. 27, 2018

(65) Prior Publication Data
US 2019/0099741 A1 Apr. 4, 2019

(30) Foreign Application Priority Data
Sep. 29, 2017 (JP) ................. 2017-190061

(51) Int. Cl.
B01J 21/06 (2006.01)
B01J 23/06 (2006.01)
B01J 23/50 (2006.01)
B01J 37/16 (2006.01)
A01N 59/16 (2006.01)
A01N 59/20 (2006.01)
B01J 37/00 (2006.01)
A01N 59/00 (2006.01)
B01J 23/62 (2006.01)
C09D 7/61 (2018.01)
B01J 23/56 (2006.01)
B01J 23/80 (2006.01)
B01J 23/89 (2006.01)
B01J 35/00 (2006.01)
C09D 1/00 (2006.01)
C09D 5/14 (2006.01)

(52) U.S. Cl.
CPC ............ B01J 21/063 (2013.01); A01N 59/00 (2013.01); A01N 59/16 (2013.01); A01N 59/20 (2013.01); B01J 23/06 (2013.01); B01J 23/50 (2013.01); B01J 23/56 (2013.01); B01J 23/626 (2013.01); B01J 23/80 (2013.01); B01J 23/8926 (2013.01); B01J 35/004 (2013.01); B01J 37/0009 (2013.01); B01J 37/16 (2013.01); C09D 1/00 (2013.01); C09D 5/14 (2013.01); C09D 7/61 (2018.01)

(58) Field of Classification Search
CPC . B01J 21/063; B01J 23/06; B01J 23/50; B01J 23/56; B01J 23/60; B01J 23/626; B01J 23/72; B01J 23/80; B01J 23/8926; B01J 35/004; B01J 37/0009; B01J 37/16; C09D 7/61; C09D 1/00; C09D 5/14; A01N 59/00; A01N 59/16; A01N 59/20; C22C 5/06; C22C 5/08; C22C 9/00; C22C 9/04; C22C 18/00; C22C 18/02
USPC ........ 502/343, 345, 347, 350; 420/477, 504, 420/506
See application file for complete search history.

(56) References Cited

U.S. PATENT DOCUMENTS

| 7,704,913 | B2* | 4/2010 | Tani .................... B01D 53/8628 502/178 |
| 9,273,378 | B2 | 3/2016 | Kitagawa et al. |
| 2006/0286051 | A1* | 12/2006 | Tanaka .................... A61K 8/25 424/65 |
| 2011/0092359 | A1 | 4/2011 | Kuroda et al. |
| 2016/0250621 | A1 | 9/2016 | Furudate et al. |
| 2016/0276688 | A1 | 9/2016 | Chu et al. |
| 2019/0099510 | A1* | 4/2019 | Furudate ................ C01G 5/006 |

FOREIGN PATENT DOCUMENTS

| EP | 2 255 878 A1 | 12/2010 |
| JP | 11-217638 A | 8/1999 |
| JP | 2000-51708 A | 2/2000 |
| JP | 2005-060695 A | 3/2005 |
| JP | 2006-089380 A | 4/2006 |
| JP | 2007-289629 A | 11/2007 |
| JP | 2008-080253 A | 4/2008 |
| JP | 2008-260684 A | 10/2008 |
| JP | 2009-263651 A | 11/2009 |

(Continued)

OTHER PUBLICATIONS

C. K. Lee et al., "Preparation and Characterization of Peroxo Titanic Acid Solution Using TiCl3." Journal of Sol-Gel Science and Technology 31, pp. 67-72. (Year: 2004).*

(Continued)

Primary Examiner — Patricia L. Hailey
(74) Attorney, Agent, or Firm — Westerman, Hattori, Daniels & Adrian, LLP

(57) ABSTRACT

A photocatalyst/alloy fine-particle dispersion containing two kinds of fine particles dispersed in an aqueous dispersion medium, (i) photocatalyst fine particles and (ii) alloy fine particles containing an antibacterial/antifungal metal, easily forms a photocatalyst/alloy fine-particle thin film of high transparency that exhibits antibacterial/antifungal properties regardless of the presence or absence of light irradiation.

10 Claims, No Drawings

(56) References Cited

FOREIGN PATENT DOCUMENTS

| | | | | |
|---|---|---|---|---|
| JP | 2010-148999 A | 7/2010 | | |
| JP | 2010-172831 A | 8/2010 | | |
| JP | 2010-234062 | * 10/2010 | ............ | A01N 25/04 |
| JP | 2011-240246 | * 12/2011 | ............ | B01J 23/835 |
| JP | 2015-34347 A | 2/2015 | | |
| JP | 2016-173979 A | 9/2016 | | |
| JP | 2017-149887 A | 8/2017 | | |
| WO | 2010/131653 A1 | 11/2010 | | |

OTHER PUBLICATIONS

Submission of Publication References dated Feb. 28, 2020, issued in counterpart JP application No. 2017-190061, with English translation. (4 pages).

Office Action dated Mar. 10, 2020, issued in counterpart JP application No. 2017-190061, with English translation. (8 pages).

* cited by examiner

PHOTOCATALYST/ALLOY FINE-PARTICLE DISPERSION HAVING ANITBACTERIAL/ANTIFUNGAL PROPERTIES, METHOD OF PREPARATION THEREOF, AND MEMBER HAVING PHOTOCATALYST/ALLOY THIN FILM ON SURFACE

CROSS-REFERENCE TO RELATED APPLICATION

This non-provisional application claims priority under 35 U.S.C. § 119(a) on Patent Application No. 2017-190061 filed in Japan on Sep. 29, 2017, the entire contents of which are hereby incorporated by reference.

TECHNICAL FIELD

This invention relates to a photocatalyst/alloy fine-particle dispersion having antibacterial and antifungal properties, a method for preparing the same, and a member having on a surface thereof a photocatalyst/alloy thin film formed using the dispersion. More particularly, the invention relates to a photocatalyst/alloy fine-particle dispersion which can easily produce a highly transparent photocatalytic thin film that exhibits antibacterial and antifungal properties regardless of the presence or absence of light irradiation, a method for preparing such a dispersion, and a member having on a surface thereof a photocatalyst/alloy thin film formed using the dispersion.

BACKGROUND ART

Consumers today expect household goods to be safe, secure, healthy and comfortable to use. There is in particular much interest in preventing microbial contamination, which prevention is closely associated with a sense of product safety and security, and a desire for products in one's everyday life to have antibacterial/antifungal qualities.

Antibacterial/antifungal agents can be broadly divided into organic agents and inorganic agents. The synthetic organic antibacterial/antifungal agents that have hitherto been commonly used are inexpensive and effective even in small amounts. Yet, they often exhibit efficacy only against certain microorganisms; the difference in effects on, for example, Gram-negative bacteria, Gram-positive bacteria and molds is sometimes considerable. Additional drawbacks include the ready emergence of resistant organisms, poor heat resistance, and efficacy that is rapid but not long-lasting. There is also a growing concern over the impact of such organic agents on the human body and the environment, which is why inorganic agents are starting to become the norm for antimicrobial agents. However, given the low efficacy of inorganic antifungal agents, most antifungal agents in use today are organic antifungal agents.

Titanium oxide-based photocatalytic materials have recently been attracting attention as inorganic antibacterial/antifungal agents and are increasingly being put to use in substrate surface cleaning, deodorizing, antibacterial and other applications. A photocatalytic reaction is a reaction occurred by excited electrons and holes that generate due to the absorption of light by titanium oxide. Photocatalytic materials are thought to have the following mechanism of action as antibacterial agents: the excited electrons and holes that have formed at the surface of the titanium oxide due to photocatalytic reactions carry out oxidation-reduction reactions with oxygen and water adsorbed to the titanium oxide surface, and the active species thus generated act on microorganisms, causing cell membrane damage and either killing the cells outright or causing them to ultimately break down through long-term action. Advantages of photocatalytic materials thus include their ability to exhibit efficacy on a broad range of microorganisms, including fungi, the low possibility of resistant organisms emerging, and the substantial lack of deterioration in efficacy over time.

Because photocatalytic reactions are triggered by exposure to light in the ultraviolet region (wavelength range: 10 to 400 nm) and light in the visible region (wavelength range: 400 to 800 nm), such efficacy cannot in principle be obtained in dark places untouched by natural light or artificial light. Yet, because bacteria and fungi proliferate even in the absence of light, in products required to have a durable performance over a desired period of time, such as antibacterial/antifungal products, there has existed a desire for photocatalytic materials which exhibit antibacterial/antifungal properties even in dark places that are not exposed to light.

Such challenges are being addressed by investigations on photocatalytic materials that complement the function of a photocatalyst by using the photocatalyst together with an antibacterial/antifungal agent other than a photocatalyst. Photocatalysts break down organic matter, and so the use of an inorganic antibacterial/antifungal agent makes sense. For example, JP-A 2000-051708 and JP-A 2008-260684 disclose that antibacterial properties and antifungal properties even in dark places are achieved by adding silver or copper as an antibacterial/antifungal ingredient.

Photocatalysts are generally used by dispersing photocatalytic particles in a solvent and mixing in a film-forming ingredient so as to form a coating which is then applied onto a substrate. However, as mentioned above, when a metal constituent such as silver, copper or zinc is added to increase the antibacterial/antifungal properties, a number of practical problems arise. Specifically, cases in which the method of supporting a metal such as silver, copper or zinc, or a compound thereof, involves reacting a metal starting material with a photocatalytic particle powder are undesirable because a great deal of effort is required to then disperse the supported catalyst in a solvent. In cases where a metal starting material is added to a dispersion in which photocatalyst particles have already been dispersed, the stability of the dispersed photocatalytic particles is compromised, causing agglomeration to arise. It is thus often difficult in practice to obtain the required transparency when forming such a photocatalytic thin film on various substrates.

In methods for obtaining antibacterial/antifungal metal-containing photocatalytic particles by adding a metal such as silver, copper or zinc, or a compound thereof, to a photocatalyst starting material and then carrying out heat treatment, the crystallinity of the photocatalytic particles decreases, and so the resulting photocatalyst performance declines. Also, because a portion of the antibacterial/antifungal metal is covered by titanium oxide and therefore is not exposed at the surface, the resulting antibacterial/antifungal properties are also diminished.

Another problem is that, when a large amount of a metal such as silver, copper or zinc, or a compound thereof, is added in order to increase the antibacterial/antifungal properties in dark places, a decreased amount of light reaches the photocatalyst, leading to a decline in the resulting catalyst performance. Hence, a photocatalytic thin film having both sufficient antibacterial/antifungal properties for practical use and the transparency required for use on various substrates has yet to exist.

Silver particles have optical, electrical and thermal properties not observed in other substances, and thus are used in various fields. Because they can be expected to exhibit antimicrobial effects even at a relatively low concentration, have a broad antimicrobial spectrum that includes fungi, and also have a high degree of safety in the human body, they are sometimes utilized in antimicrobial coatings. However, silver readily reacts with the sulfur constituent of sulfur compounds such as hydrogen sulfide that are present in trace amounts within the environment to form silver sulfide, leading to associated problems such as discoloration and a weakening of the antimicrobial effects.

According to JP-A 2015-034347, because alloys exhibit qualities that differ from those of the constituent metal elements in unalloyed form, properties unattainable with existing metals alone are expected to emerge with the creation of new alloys. For example, JP-A H11-217638 examines the alloying of silver as a means for increasing the sulfidation resistance of silver.

CITATION LIST

Patent Document 1: JP-A 2000-051708
Patent Document 2: JP-A 2008-260684
Patent Document 3: JP-A 2015-034347
Patent Document 4: JP-A H11-217638

DISCLOSURE OF INVENTION

It is therefore an object of the present invention to provide a photocatalyst/alloy fine-particle dispersion that can easily produce a photocatalyst/alloy thin film which, regardless of the presence or absence of light irradiation, exhibits antibacterial/antifungal properties and has a high transparency. A further object of the invention is to provide a method for preparing such a dispersion. A still further object is to provide a member having on a surface thereof a photocatalyst/alloy thin film that is formed by using such a dispersion.

As a result of extensive investigations, we have discovered that a photocatalyst/alloy fine-particle dispersion obtained by dispersing two kinds of fine particles, titanium oxide fine particles and antibacterial/antifungal metal-containing alloy fine particles, in an aqueous dispersion medium can easily produce a photocatalyst/alloy thin film that, regardless of the presence or absence of light irradiation, exhibits high antibacterial/antifungal properties and also has a high transparency.

Accordingly, in one aspect, the invention provides a photocatalyst/alloy fine-particle dispersion that includes two kinds of fine particles dispersed in an aqueous dispersion medium: (i) photocatalyst fine particles, and (ii) alloy fine particles containing an antibacterial/antifungal metal.

The photocatalyst fine particles are preferably titanium oxide fine particles.

The antibacterial/antifungal metal contained in the alloy fine particles (ii) is preferably at least one metal selected from the group consisting of silver, copper and zinc, and more preferably includes at least silver.

The amount of antibacterial/antifungal metal contained in the alloy fine particles (ii) is preferably from 1 to 100 wt % based on the total weight of the alloy fine particles.

The photocatalyst fine particles (i) and the antibacterial/antifungal metal-containing alloy fine particles (ii) preferably have a volume-based 50% cumulative distribution size ($D_{50}$), as measured by dynamic laser light scattering, of from 5 to 100 nm.

The photocatalyst/alloys fine-particle dispersion may further include a binder, which binder is preferably a silicon compound-based binder.

In a second aspect, the invention provides a member having on a surface thereof a photocatalyst/alloy thin film formed by using the photocatalyst/alloy fine-particle dispersion of the first aspect of the invention.

In a third aspect, the invention provides a method for preparing a photocatalyst/alloy fine-particle dispersion, which method includes the steps of:

(1) preparing a peroxotitanic acid solution from a starting titanium compound, a basic substance, hydrogen peroxide and an aqueous dispersion medium;

(2) preparing a titanium oxide fine-particle dispersion by heating the peroxotitanic acid solution prepared in Step (1) at between 80 and 250° C. under pressure control;

(3) preparing a solution containing a starting antibacterial/antifungal metal compound and a solution containing a reducing agent for reducing the starting metal compound;

(4) preparing an alloy fine-particle dispersion by mixing together the solution containing a starting antibacterial/antifungal metal compound and the solution containing a reducing agent for reducing the starting metal compound that were prepared in Step (3);

(5) washing the alloy fine-particle dispersion prepared in Step (4) with an aqueous dispersion medium by membrane filtration method; and (6) mixing together the titanium oxide fine-particle dispersion and the alloy fine-particle dispersion obtained in Steps (2) and (5).

ADVANTAGEOUS EFFECTS OF THE INVENTION

The photocatalyst/alloy fine-particle dispersion of the invention which contains two kinds of fine particles dispersed in an aqueous dispersion medium: (i) photocatalyst fine particles and (ii) alloy fine particles containing an antibacterial-antifungal metal, can easily form a photocatalyst/alloy fine-particle thin film of high transparency that exhibits antibacterial/antifungal properties regardless of the presence or absence of light irradiation. The invention additionally provides a method for preparing such a dispersion, and a member having on a surface thereof a photocatalyst/alloy thin film formed by using the dispersion.

DESCRIPTION OF THE PREFERRED EMBODIMENTS

The objects, features and advantages of the invention will become more apparent from the following detailed description.

The photocatalyst/alloy fine-particle dispersion of the invention includes the following two kinds of fine particles dispersed in an aqueous dispersion medium: (i) photocatalyst fine particles, and (ii) alloy fine particles containing an antibacterial antifungal metal. As subsequently described, this dispersion is obtained by mixing together two different, separately prepared, fine-particle dispersions: a photocatalyst (titanium oxide) fine-particle dispersion, and an antibacterial/antifungal metal-containing alloy fine-particle dispersion.

Photocatalytic Fine Particle Dispersion

In this invention, the "photocatalyst" refers to a general term of substances exhibiting a photocatalytic activity by exposure of light having an energy higher than a predetermined band gap. One or a combination of two or more kinds of fine particles of known metal oxide semiconductors, such as titanium oxide, tungsten oxide, zinc oxide, tin oxide, iron oxide, bismuth oxide, bismuth vanadate and strontium titanate, may be used as such substances. Of these, it is desirable to use titanium oxide fine particles because they have an especially high photocatalytic activity under exposure of light including ultraviolet light having a wavelength of up to 400 nm, are chemically stable, and the synthesis of nanosize particles as well as the dispersion of such nanosize particles in a solvent is relatively easy.

Titanium oxide fine particles are generally known to have three crystal phases: rutile, anatase and brookite. The use of chiefly anatase or ruffle is preferred. Here, "chiefly" means generally at least 50 wt %, preferably at least 70 wt %, and more preferably at least 90 wt %, and may even be 100 wt %, of all the titanium oxide fine-particle crystals.

To increase the photocatalytic activity of the titanium oxide fine particles, a metal oxide of platinum, gold, palladium, iron, copper, nickel or the like may be supported on the titanium oxide fine particles, or the titanium oxide fine particles may be doped with an element such as tin, nitrogen, sulfur or carbon.

An aqueous solvent is typically used as the aqueous dispersion medium in the photocatalyst fine-particle dispersion. The use of water is preferred, although a mixed solvent of water and a hydrophilic organic solvent that mixes with water in any ratio may be used. The water is preferably, for example, deionized water, distilled water, or purified water. The hydrophilic organic solvent is preferably, for example, an alcohol such as methanol, ethanol or isopropanol; a glycol such as ethylene glycol; or a glycol ether such as ethylene glycol monomethyl ether, ethylene glycol monoethyl ether or propylene glycol n-propyl ether. When a mixed solvent is used, the proportion of hydrophilic organic solvent in the mixed solvent is preferably more than 0 wt % and up to 50 wt %, more preferably 20 wt % or less, and even more preferably 10 wt % or less.

The titanium oxide fine particles (i) in the photocatalyst (titanium oxide) fine-particle dispersion have a volume-based 50% cumulative distribution size ($D_{50}$), as measured by dynamic laser light scattering (also referred to below as the "average particle size"), of preferably from 5 to 30 nm, and more preferably from 5 to 20 nm. At an average particle size below 5 nm, the photocatalytic activity may be inadequate; at more than 30 nm, the dispersion may become opaque. Instruments that may be used to measure the average particle size include, for example, the ELSZ-2000ZS (Otsuka Electronics Co., Ltd.), the Nanotrac UPA-EX150 (Nikkiso Co., Ltd.) and the LA-910 (Horiba, Ltd.).

In terms of the ease of producing the subsequently described photocatalyst/alloy thin film of the required thickness, the concentration of titanium oxide fine particles in the photocatalyst (titanium oxide) fine-particle dispersion is preferably from 0.01 to 30 wt %, and more preferably from 0.5 to 20 wt %.

Here, using the formula shown below, the concentration of the photocatalyst (titanium oxide) fine-particle dispersion can be calculated from the weight of nonvolatile matter (titanium oxide fine particles) remaining when a portion of the titanium oxide fine-particle dispersion is sampled and heated at 105° C. for 3 hours to evaporate off the solvent and from the weight of the sampled titanium oxide fine-particle dispersion.

Concentration (%) of titanium oxide fine-particle dispersion=[weight of nonvolatile matter (g)/ weight of titanium oxide fine-particle dispersion (g)]×100

Antibacterial/Antifungal Metal-Containing Alloy Fine-Particle Dispersion

In this invention, the alloy fine particles are made of two or more different metal constituents, including at least one metal constituent which increases the antibacterial/antifungal properties.

Here, the "metal constituent which increases the antibacterial/antifungal properties" refers to a metal constituent that is harmful to microorganisms such as bacteria and fungi but is relatively harmless to the human body. Illustrative examples include, when particles of the metal constituent are coated onto a film and the test stipulated in JIS Z 2801 (Antibacterial Treated Products: Test of Antibacterial Activity and Efficacy) is carried out, metals for which reductions in the viable cell counts of *Staphylococcus aureus* and *Escherichia coil* are observed, such as silver, copper, zinc, platinum, palladium, nickel, aluminum, titanium, cobalt, zirconium, molybdenum and tungsten (see, for example: Miyano: *Tetsu to Hagane* 93(2007), No. 1, 57-65; and H. Kawakami: *ISIJ International* 48 (2008), No. 9, 1299-1304).

The alloy fine particles of the invention are preferably made of an alloy containing at least one of these metals, and more preferably an alloy containing at least one metal from among silver, copper and zinc.

More specific examples include alloy fine particles containing a combination of metal constituents, such as silver-copper, silver-palladium, silver-platinum, silver-tin, gold-copper, silver-nickel, silver-antimony, silver-copper-tin, gold-copper-tin, silver-nickel-tin, silver-antimony-tin, platinum-manganese, silver-titanium, copper-tin, cobalt-copper, zinc-magnesium, silver-zinc, copper-zinc and silver-copper-zinc.

Metal constituents other than those metal constituents which increase the antibacterial/antifungal properties within the alloy fine particles are not particularly limited. One or more may be selected from among gold, antimony, tin, sodium, magnesium, silicon, phosphorus, sulfur, potassium, calcium, scandium, vanadium, chromium, manganese, iron, gallium, germanium, arsenic, selenium, yttrium, niobium, technetium, ruthenium, rhodium, indium, tellurium, cesium, barium, hafnium, tantalum, rhenium, osmium, iridium, mercury, thallium, lead, bismuth, polonium, radium, lanthanum, cerium, praseodymium, neodymium, promethium, samarium, europium, gadolinium, actinium and thorium.

The content of metal constituents that increase the antibacterial/antifungal properties within the alloy fine particles may be set to from 1 to 100 wt %, preferably from 10 to 100 wt %, and more preferably from 50 to 100 wt %, of the total weight of the alloy fine particles. At less than 1 wt % of metal constituents that increase the antibacterial/antifungal properties, a sufficient antibacterial/antifungal performance may not be exhibited.

An aqueous solvent is generally used as the aqueous dispersion medium of the alloy fine-particle dispersion, with the use of water, a water-soluble organic solvent that is miscible with water, or a mixed solvent of water and a water-soluble organic solvent being preferred. Preferred examples of the water include deionized water, distilled water and pure water. Examples of water-soluble organic solvents include alcohols such as methanol, ethanol, n-propanol, 2-propanol, n-butanol, 2-butanol, tert-butanol, ethylene glycol, diethylene glycol and polyethylene glycol; glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and propylene glycol n-propyl ether; ketones such as acetone and methyl ethyl ketone; water-soluble nitrogen-containing compounds such as 2-pyrrolidone and N-methylpyrrolidone; and ethyl acetate. These may be used singly, or two or more may be used in combination.

The dispersed particle size of the alloy fine particles (ii) in the alloy fine-particle dispersion, expressed as the volume-based 50% cumulative distribution size ($D_{50}$) measured by dynamic laser light scattering (also referred to below as "average particle size"), is preferably 200 nm or less, more preferably 100 nm or less, and even more preferably 70 nm or less. There is no particular lower limit to the average particle size and so use may theoretically be made of particles having a size down to the minimum size at which the particles are capable of having antibacterial/antifungal properties. However, a particle size of 1 nm or more is preferred for practical reasons. On the other hand, an average particle size in excess of 200 nm is undesirable because the dispersion becomes opaque. Instruments that may be used to measure the average particle size include, for example, the ELSZ-2000ZS (Otsuka Electronics Co., Ltd.), the Nanotrac UPA-EX150 (Nikkiso Co., Ltd.) and the LA-910 (Horiba, Ltd.).

The concentration of alloy fine particles in the alloy fine-particle dispersion is not particularly limited. However, because a lower concentration generally results in better dispersion stability, the concentration is preferably between 0.0001 and 10 wt %, more preferably between 0.001 and 5 wt %, and even more preferably between 0.01 and 1 wt %. At a concentration below 0.0001 wt %, the productivity becomes very low, which is undesirable.

Photocatalyst/Alloy Fine-Particle Dispersion

The photocatalyst/alloy fine-particle dispersion of the invention is obtained, as described above, by mixing together two different, separately prepared, fine-particle dispersions: a photocatalyst (titanium oxide) fine-particle dispersion and an antibacterial/antifungal metal-containing alloy fine-particle dispersion.

Here, the dispersed particle size of the mixture of (i) photocatalyst (titanium oxide) fine particles and (ii) antibacterial/antifungal metal-containing alloy fine particles in the photocatalyst/alloy fine-particle dispersion, expressed as the volume-based 50% cumulative distribution size ($D_{50}$) measured by dynamic laser light scattering (also referred to below as "average particle size"), is preferably from 5 to 100 nm, more preferably from 5 to 30 nm, and even more preferably from 5 to 20 nm. At an average particle size below 5 nm, the photocatalytic activity may be inadequate. On the other hand, at an average particle size greater than 100 nm, the dispersion may become opaque.

The instrument for measuring the average particle size of the mixture of fine particles (i) and (ii) is the same as that described above.

The photocatalyst/alloy fine-particle dispersion of the invention may further include the subsequently described binder.

Method for Preparing Photocatalyst/Alloy Fine-Particle Dispersion

The inventive method for preparing a photocatalyst/alloy fine-particle dispersion is one which ultimately obtains two types of fine particles, (i) photocatalyst fine particles and antibacterial/antifungal metal-containing alloy fine particles, in a dispersed state within an aqueous dispersion medium. This method includes the following steps (1) to (6):

(1) preparing a peroxotitanic acid solution from a starting titanium compound, a basic substance, hydrogen peroxide and an aqueous dispersion medium;

(2) preparing a titanium oxide fine-particle dispersion by heating the peroxotitanic acid solution prepared in Step (1) at between 80 and 250° C. under pressure control;

(3) preparing a solution containing a starting antibacterial/antifungal metal compound and a solution containing a reducing agent for reducing the starting metal compound;

(4) preparing an alloy fine-particle dispersion by mixing together the solution containing a starting antibacterial/antifungal metal compound and the solution containing a reducing agent for reducing the starting metal compound prepared in Step (3);

(5) washing the alloy fine-particle dispersion prepared in Step (4) with an aqueous dispersion medium by membrane filtration method; and (6) mixing together the titanium oxide fine-particle dispersion and the alloy fine-particle dispersion obtained in Steps (2) and (5).

Steps (1) and (2) are steps for preparing the photocatalyst fine-particle dispersion.

Steps (3) to (5) are steps for preparing the alloy fine-particle dispersion. Although both physical methods and chemical methods exist, use is made in particular of liquid-phase reduction method, this being a chemical method for which the synthesis conditions are easy to adjust, which has broad controllable ranges in parameters such as composition, particle size and particle size distribution, and which has superior productivity. Liquid-phase reduction method mixes a reducing agent into a solution containing the two or more types of metal ions serving as the starting materials for the alloy, inducing the precipitation of alloy fine particles. The dispersibility of the alloy fine particles in the solvent can be further enhanced by also having an alloy fine-particle protecting agent present within the reaction system at this time.

Step (6) ultimately prepares a photocatalyst/alloy fine-particle dispersion having antibacterial/antifungal properties by mixing together the photocatalyst fine-particle dispersion prepared in Step (2) and the alloy fine-particle dispersion obtained in Step (5).

The individual steps are described in detail below.
Step (1):

In Step (1) a peroxotitanic acid solution is prepared by reacting a starting titanium compound, a basic substance and hydrogen peroxide in an aqueous dispersion medium.

The reaction method may be either a method that adds the basic substance to the starting titanium compound within the aqueous dispersion medium to form titanium hydroxide, removes impurity ions other than the metallic ions to be included, and adds hydrogen peroxide to form peroxotitanic acid; or a method that adds hydrogen peroxide to the starting titanium compound and then adds the basic substance to form a peroxotitanium hydrate, removes impurities other than the metal ions to be included, and adds further hydrogen peroxide to form peroxotitanic acid.

Examples of the starting titanium compound include chlorides, nitrates, sulfates and other inorganic acid salts of titanium; formic acid, citric acid, oxalic acid, lactic acid, glycolic acid and other organic acid salts of titanium; and the titanium hydroxide that is made to settle out by adding an alkali to aqueous solutions of the foregoing salts and carrying out hydrolysis. Such starting titanium compounds may be used singly or two or more may be used in combination. Of these, the use of titanium chlorides ($TiCl_3$, $TiCl_4$) is preferred.

The above-mentioned aqueous dispersion media may be used in the manner formulated above as the aqueous dispersion medium. The concentration of the aqueous solution of starting titanium compound formed of the starting titanium compound and the aqueous dispersion medium is preferably 60 wt % or less, and more preferably 30 wt % or less. The concentration lower limit is suitably selected, although in general it is preferably at least 1 wt %.

The purpose of the basic substance is to smoothly convert the starting titanium compound into titanium hydroxide. Illustrative examples include hydroxides of alkali metals or alkaline earth metals, such as sodium hydroxide and potassium hydroxide; and amine compounds such as ammonia, alkanolamines and alkylamines. The basic substance is added and used in an amount such as to bring the pH of the aqueous solution of the starting titanium compound to 7 or above, and especially from 7 to 10. The basic substance may be used together with the aqueous dispersion medium after first being rendered into an aqueous solution of a suitable concentration.

The purpose of the hydrogen peroxide is to convert the starting titanium compound or titanium hydroxide into peroxotitanium—that is, a titanium oxide compound containing a Ti—O—O—Ti bond, and is typically used in the form of hydrogen peroxide water. The amount of hydrogen peroxide added is preferably set to from 1.5 to 20 moles per mole of titanium. When adding hydrogen peroxide and converting the starting titanium compound or titanium hydroxide into peroxotitanic acid, the reaction temperature is preferably set to between 5 and 80° C. and the reaction time is preferably set to from 30 minutes to 24 hours.

The resulting peroxotitanic acid solution may, for the sake of pH adjustment or the like, include an alkaline substance or an acidic substance. Illustrative examples of what are referred to here as alkaline substances include ammonia, sodium hydroxide, calcium hydroxide and alkylamines. Illustrative examples of acidic substances include inorganic acids such as sulfuric acid, nitric acid, hydrochloric acid, carbonic acid, phosphoric acid and hydrogen peroxide; and organic acids such as formic acid, citric acid, oxalic acid, lactic acid and glycolic acid. The pH of the peroxotitanic acid solution obtained at this time is from 1 to 9, with a pH of from 4 to 7 being preferred from the standpoint of safety during handling.

Step (2):

In Step (2), the peroxotitanic acid solution obtained in Step (1) is finished to a hydrothermal reaction under pressure control and a temperature of between 80 and 250° C., preferably between 100 and 250° C., for a period of from 0.01 to 24 hours. From the standpoint of reaction efficiency and reaction controllability, a reaction temperature of between 80 and 250° C. is appropriate. As a result, the peroxotitanic acid is converted to titanium oxide fine particles. Here, "under pressure control" means to carry out suitable pressurization in such a way as to be able to maintain the reaction temperature in cases where the reaction temperature exceeds the boiling point of the dispersion medium. This includes control at atmospheric pressure in cases where the temperature is at or below the boiling point of the dispersion medium. The pressure used here is generally between about 0.12 MPa and about 4.5 MPa, preferably between about 0.15 MPa and about 4.5 MPa, and more preferably between about 0.20 MPa and about 4.5 MPa. The reaction time is preferably from 1 minute to 24 hours. Step (2) thus provides a titanium oxide fine-particle dispersion.

The size of the resulting titanium oxide fine particles is preferably in the range already mentioned above. It is possible to control the particle size by adjusting the reaction conditions. For example, the particle size can be made smaller by shortening the reaction time or the temperature rise time.

Step (3):

In Step 3, a solution of a starting antibacterial/antifungal metal compound dissolved in an aqueous dispersion medium and a solution of a reducing agent for reducing this starting metal compound dissolved in an aqueous dispersion medium are prepared.

The method for preparing these solutions may be a method in which a starting antibacterial/antifungal metal compound and a reducing agent for reducing this starting metal compound are each separately added to an aqueous dispersion medium and dissolved by stirring. The stirring method is not particularly limited, so long as it is a method capable of effecting uniform dissolution in the aqueous dispersion medium. A commonly available stirrer may be used for this purpose.

Various antibacterial/antifungal metal compounds may be used as the starting antibacterial/antifungal metal compound. Examples include inorganic acid salts (e.g., chlorides, nitrates, sulfates), organic acid (e.g., formic acid, citric acid, oxalic acid, lactic acid, glycolic acid) salts; and complex salts (e.g., ammine complexes, cyano complexes, halogeno complexes, hydroxy complexes) of antibacterial/antifungal metals. These may be used singly, or two or more may be used in combination. Of these, the use of inorganic acid salts such as chlorides, nitrates and sulfates is preferred.

Any of various reducing agents that can reduce the metal ions making up the starting antibacterial/antifungal metal compounds may be used without particular limitation. Examples include hydrazines such as hydrazine, hydrazine monohydrate, phenyl hydrazine and hydrazinium sulfate; amines such as dimethylaminoethanol, triethylamine, octylamine and dimethylaminoborane; organic acids such as citric acid, ascorbic acid, tartaric acid, malic acid, malonic acid and formic acid; alcohols such as methanol, ethanol, isopropyl alcohol, ethylene glycol, diethylene glycol, triethylene glycol, tetraethylene glycol and benzotriazole; hydrides such as sodium borohydride, lithium borohydride, lithium triethylborohydride, lithium aluminum hydride, diisobutylaluminum hydride, tributyltin hydride, lithium tri (sec-butyl)borohydride, potassium tri(sec-butyl)borohydride, zinc borohydride and sodium acetoxyborohydride; pyrrolidones such as polyvinyl pyrrolidone, 1-vinyl pyrrolidone, N-vinyl pyrrolidone and methyl pyrrolidone; reducing sugars such as glucose, galactose, mannose, fructose, sucrose, maltose, raffinose and stachyose; and sugar alcohols such as sorbitol. These may be used singly, or two or more may be used in combination. The aqueous dispersion medium that dissolves the reducing agent may be one similar to the aqueous dispersion medium used for the metal compound.

A protective agent may be added to the solution obtained by dissolving the reducing agent in an aqueous dispersion medium. The protective agent is not particularly limited, so long as it is one than can prevent the agglomeration of alloy particles that have been reduced and have settled out of solution. Use can be made of surfactants and organic compounds having the ability to function as dispersants. Illustrative examples include surfactants such as anionic surfactants, cationic surfactants and nonionic surfactants; water-soluble polymer compounds such as polyvinyl pyrrolidone, polyvinyl alcohol, polyethyleneimine, polyethylene oxide, polyacrylic acid and methylcellulose; aliphatic amine compounds such as ethanolamine, diethanolamine, triethanolamine and propanolamine; primary amine compounds such as butylamine, dibutylamine, hexylamine, cyclohexylamine, heptylamine, 3-butoxypropylamine, octylamine, nonylamine, decylamine, dodecylamine, hexadecylamine, oleylamine and octadecylamine; diamine compounds such as N,N-dimethylethylenediamine and N,N-diethylethylenediamine; and carboxylic acid compounds such as oleic acid.

Water, a water-soluble organic solvent that is miscible with water, and mixed solvents of water and a water-soluble organic solvent are preferred as the aqueous dispersion medium (aqueous solvent). The water is preferably, for example, deionized water, distilled water or pure water. Examples of the water-soluble organic solvent include alcohols such as methanol, ethanol, isopropanol, n-propanol, 2-propanol, n-butanol, 2-butanol, tert-butanol, ethylene glycol and diethylene glycol; glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and propylene glycol n-propyl ether; ketones such as acetone and methyl ethyl ketone; water-soluble nitrogen-containing compounds such as 2-pyrrolidone and N-methylpyrrolidone; and ethyl acetate. The water-soluble organic solvent may be used singly, or two or more may be used in combination.

A basic substance or an acidic substance may be added to the solvent. Examples of basic substances include alkali metal hydroxides such as sodium hydroxide and potassium hydroxide; alkali metal carbonates such as sodium carbonate and potassium carbonate; alkali metal bicarbonates such as sodium bicarbonate and potassium bicarbonate; alkali metal alkoxides such as potassium tert-butoxide, sodium methoxide and sodium ethoxide; alkali metal salts of aliphatic hydrocarbons, such as butyl lithium; and amines such as triethylamine, diethylaminoethanol and diethylamine. Examples of acidic substances include inorganic acids such as aqua regia, hydrochloric acid, nitric acid and sulfuric acid; and organic acids such as formic acid, acetic acid, chloroacetic acid, dichloroacetic acid, oxalic acid, trifluoroacetic acid and trichloroacetic acid.

The concentrations of these two solutions are not particularly limited. However, in general, given the tendency to be able to, at a lower concentration, make the primary particle size of the individual alloy fine particles that form smaller, it is preferable to set the concentration within a suitable concentration range in accordance with the target range in the primary particle size.

The pH levels of these two solutions are not particularly limited and are preferably adjusted to suitable pH levels in accordance with, for example, the intended molar ratio of the metals within the alloy fine particles and the intended primary particle size.

Step (4):

In Step (4), the solution of starting antibacterial/antifungal metal compound dissolved in an aqueous dispersion medium and the solution of a reducing agent for reducing this metal compound dissolved in an aqueous dispersion medium, both of which were prepared in Step (3), are mixed together to prepare an alloy fine-particle dispersion.

The method for mixing these two solutions is not particularly limited, provided it is a method capable of uniformly mixing the two solutions. Exemplary methods include the following: method placing the metal compound solution and the reducing agent solution in a reaction vessel and stirring the reactor contents to effect mixture; method placing the metal compound solution in a reaction vessel and, under stirring of the reactor contents, adding the reducing agent solution dropwise and stirring to effect mixture; method placing the reducing agent solution in a reaction vessel and, under stirring of the reactor contents, adding the metal compound solution dropwise and stirring to effect mixture; and method continuously feeding the metal compound solution and the reducing agent solution volumetrically, and mixing them together in a reaction vessel or a microreactor.

The temperature during mixing is not particularly limited, and is preferably adjusted to a suitable temperature in accordance with, for example, the intended molar ratio of the metals within the alloy fine particles and the intended primary particle size.

Step (5):

In Step (5), the alloy fine-particle dispersion prepared in Step (4) is washed with an aqueous dispersion medium by membrane filtration method.

The aqueous dispersion medium used is preferably water, a water-soluble organic solvent that is miscible with water, or a mixed solvent of water and a water-soluble organic solvent. The water is preferably deionized water, distilled water, pure water or the like. Examples of the water-soluble organic solvent include alcohols such as methanol, ethanol, isopropanol, n-propanol, 2-propanol, n-butanol, 2-butanol, tert-butanol, ethylene glycol and diethylene glycol; glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and propylene glycol n-propyl ether; ketones such as acetone and methyl ethyl ketone; water-soluble nitrogen-containing compounds such as 2-pyrrolidone and N-methylpyrrolidone; and ethyl acetate. The water-soluble organic solvent may be used singly, or two or more may be used in combination.

Membrane filtration method washes and separates out nonvolatile impurities other than the alloy fine particles, such as constituents other than metal within the starting metal compound, the reducing agent and the protective agent, from the fine-particle dispersion. Washing is carried out until the weight ratio between alloy fine particles and nonvolatile impurities (alloy fine particles/nonvolatile impurities) in the alloy fine-particle dispersion becomes preferably from 0.01 to 10, more preferably from 0.05 to 5, and even more preferably from 0.1 to 1. At a weight ratio below 0.01, the amount of impurities relative to the alloy fine particles is high, and so the resulting antibacterial/antifungal properties and photocatalytic performance may be inadequate. At a weight ratio greater than 10, the alloy fine particle-dispersing stability may decrease, which is undesirable.

Determining Concentration of Metal Constituents in Alloy Fine-Particle Dispersion (ICP-OES)

The concentration of metal constituents in the alloy fine-particle dispersion can be measured by suitably diluting the alloy fine-particle dispersion with pure water and introducing it into an inductively coupled plasma emission spectrophotometer (available from Agilent Technologies Japan, Ltd. under the trade name Agilent 5110 ICP-OES).

Determining Concentration of Nonvolatile Impurities Other than Metal Constituents in Alloy Fine-Particle Dispersion The concentration of nonvolatile impurities other than metal constituents in the alloy fine-particle dispersion can be determined by measuring the weight of the nonvolatile matter (alloy fine particles+nonvolatile impurities) remaining when a portion of the alloy fine-particle dispersion is sampled and heated at 105° C. for 3 hours to evaporate off the solvent, calculating the concentration of nonvolatile matter from the weight of nonvolatile matter and the weight of the alloy fine-particle dispersion, and subtracting the metal constituent concentration determined above by ICP-OES from the concentration of nonvolatile matter.

Nonvolatile Impurity Concentration (%)=[nonvolatile matter weight (g)/alloy fine-particle dispersion weight (g)]×100−[percent concentration of metal constituents in alloy fine-particle dispersion]

The membrane used in membrane filtration method is not particularly limited, provided it is one that can separate off alloy fine particles and nonvolatile impurities other than alloy fine particles from the alloy fine-particle dispersion. Examples include microfiltration membranes, ultrafiltration membranes and nanofiltration membranes. Membrane filtration method may be carried out using a membrane having a suitable pore size from among these.

The method of filtration used may be, for example, any of the following: centrifugal filtration, pressure filtration or crossflow filtration.

Regarding the shape of the filter membrane, use may be made of a membrane filter having a suitable morphology, such as a hollow-fiber, spiral, tubular or flat membrane.

The filter membrane material is not particularly limited, so long as it has durability to alloy fine-particle dispersions. The material used may be suitably selected from among, for example, organic membranes made of polyethylene, tetrafluoroethylene, polypropylene, cellulose acetate, polyacrylonitrile, polyimide, polysulfone or polyethersulfone; and inorganic membranes made of silica, alumina, zirconia or titania.

Specific examples of such filter membranes include Microza (Asahi Kasei Corporation), Amicon Ultra (Merck Millipore), Ultrafilter (Advantec Toyo) and MEMBRALOX (Nihon Pore K K).

Step (6):

In Step (6), the titanium oxide fine-particle dispersion obtained in Step (2) and the alloy fine-particle dispersion obtained in Step (5) are mixed together, giving a photocatalyst/alloy fine-particle dispersion having antibacterial/antifungal properties.

The method of mixture is not particularly limited, provided it is a method that uniformly mixes together the two dispersions. For example, mixing may be carried out by stirring using a commonly available stirrer.

The mixing proportions of the titanium oxide fine-particle dispersion and the alloy fine-particle dispersion, expressed as the weight ratio (titanium oxide fine particles/alloy fine particles) between the fine particles in the respective dispersions of titanium oxide fine particles and alloy fine particles, is between 1 and 100,000, preferably between 10 and 10,000, and more preferably between 20 and 1,000. A ratio below 1 is undesirable because a sufficient photocatalytic ability is not exhibited, and a ratio greater than 100,000 is undesirable because a sufficient antibacterial/antifungal ability is not exhibited.

The size of the dispersed particles in the mixture of titanium oxide fine particles and alloy fine particles within the photocatalyst/alloy fine-particle dispersion is represented as the volume-based 50% cumulative distribution size (D50) measured by dynamic laser light scattering (also referred to below as the "average particle size"), which is described above.

The instrument used to measure the average particle size is also as described above.

In terms of the ease of producing a photocatalyst/alloy thin film of the required thickness, the sum of the concentrations of the titanium oxide fine particles, alloy fine particles and nonvolatile impurities in the photocatalyst/alloy fine-particle dispersion thus prepared is, as mentioned above, preferably from 0.01 to 20 wt %, and more preferably from 0.5 to 10 wt %. With regard to adjusting the concentration, in cases where the concentration is higher than the desired concentration, the concentration can be lowered by adding aqueous dispersion medium to dilute the dispersion. In cases where the concentration is lower than desired, the concentration can be increased by evaporating off and removing by filtration some of the aqueous dispersion medium.

The concentration of the photocatalyst/alloy fine-particle dispersion can be calculated as follows from the weight of the nonvolatile matter (titanium oxide fine particles, alloy fine particles and nonvolatile impurities) remaining when a portion of the photocatalyst/alloy fine-particle dispersion is sampled and heated at 105° C. for 3 hours to evaporate off the solvent and the weight of the sampled photocatalyst/alloy fine-particle dispersion.

Concentration (%) of photocatalyst/alloy fine-particle dispersion=[weight of nonvolatile matter (g)/weight of photocatalyst/alloy fine-particle dispersion (g)]×100

A binder may be added to the photocatalyst/alloy fine-particle dispersion, both for the purpose of making the dispersion easier to apply to the surface of the subsequently described various types of members and also to make the fine particles readily adhering. Exemplary binders include metal compound-based binders that contain, for example, silicon, aluminum, titanium or zirconium, and organic resin-based binders that contain, for example, a fluoroplastic, acrylic resin or urethane resin.

The binder is added and used in a weight ratio of the binder to the photocatalyst/alloy fine particles, expressed as [binder(titanium oxide fine particles+alloy fine particles)], of preferably between 0.01 and 99, more preferably between 0.1 and 9, and even more preferably between 0.4 and 2.5. At a weight ratio below 0.01, adherence of the photocatalyst fine particles to the surface of various types of members may be inadequate; at a weight ratio above 99, the antibacterial/antifungal activity and photocatalytic activity may be inadequate.

In particular, to obtain an excellent photocatalyst/alloy thin film having an antibacterial/antifungal activity, a photocatalytic activity and a high transparency, it is desirable for a silicon compound-based binder to be added and used in a compounding ratio (weight ratio of silicon compound to titanium oxide fine particles+alloy fine particles) of preferably between 1:99 and 99:1, more preferably between 10:90 and 90:10, and even more preferably between 30:70 and 70:30. Here, the "silicon compound-based binder" refers to a colloidal dispersion, solution or emulsion of a silicon compound that is obtained by including a solid or liquid silicon compound in an aqueous dispersion medium. Illustrative examples include colloidal silica (preferred particle size, 1 to 150 nm); solutions of silicates; silane and siloxane hydrolyzate emulsions; silicone resin emulsions; and emulsions of copolymers of a silicone resin with another resin, such as silicone-acrylic resin copolymers and silicone-urethane resin copolymers.

In cases where such a binder that increases film formability is added, it is preferably added to a photocatalyst/alloy fine-particle dispersion whose concentration has been adjusted as described above, in such manner as to achieve the desired concentration following mixture of the added aqueous binder solution.

Member Having Photocatalyst/Alloy Thin Film on Surface

The photocatalyst/alloy fine-particle dispersion of the invention can be used to form a photocatalyst/alloy thin film on the surface of various types of members. No particular limitation is imposed on the type of member. Materials of which the member may be composed include organic materials and inorganic materials. Such members may have a variety of shapes according to their respective purposes and applications.

Illustrative examples of organic materials include synthetic resin materials such as vinyl chloride resin (PVC), polyethylene (PE), polypropylene (PP), polycarbonate (PC), acrylic resin, polyacetal, fluoroplastic, silicone resin, ethylene-vinyl acetate copolymer (EVA), acrylonitrile-butadiene rubber (NBR), polyethylene terephthalate (PET), polyethylene naphthalate (PEN), polyvinyl butyral (PVB), ethylene-vinyl alcohol copolymer (EVOH), polyimide resin, polyphenylene sulfide (PPS), polyetherimide (PEI), polyetheretherimide (PEEI), polyetheretherketone (PEEK), melamine resin, phenolic resin and acrylonitrile-butadiene-styrene (ABS) resin; natural materials such as natural rubber; and semi-synthetic materials made of the above synthetic resin materials and natural materials. These materials may be rendered into products of a required shape and construction, such as films, sheets, textile materials, textile products and other moldings or laminates.

Examples of inorganic materials include nonmetallic inorganic materials and metallic inorganic materials. Examples of nonmetallic inorganic materials include glass, ceramic and stone. These may be rendered into products of various forms, such as tile, glass, mirrors, walls and decorative materials. Examples of metallic inorganic materials include cast iron, steel, iron, ferrous alloys, aluminum, aluminum alloys, nickel, nickel alloys and diecast zinc. These may be plated with the above metallic inorganic materials or coated with the above organic materials, or may be platings applied to the surface of the above organic materials or nonmetallic inorganic materials.

Of the various above members, the photocatalyst/alloy fine-particle dispersion of the invention is especially useful for producing a transparent photocatalyst/alloy thin film on polymer films such as PET.

The method of forming photocatalyst/alloy thin film on the surface of various types of members may be one in which the photocatalyst/alloy fine-particle dispersion is coated onto the surface of the member by a known coating method such as spray coating or dip coating, and then dried by a known drying method such as far-infrared drying, drying by induction heating or hot-air drying. The thickness of the photocatalyst/alloy thin film may be variously selected, although a thickness in the range of from 10 nm to 10 µm is generally preferred.

A coat of the above-described photocatalyst/alloy fine particles is formed in this way. In cases where binder is included in the above-indicated amount within the dispersion, a coat that contains photocatalyst/alloy fine particles and binder is formed.

The photocatalyst/alloy thin film that is formed in this way is transparent and not only imparts a good photocatalytic activity under exposure of light as in the prior art, but also can obtain an excellent antibacterial/antifungal activity even in dark places. Various types of members on which such a photocatalyst/alloy thin film has been formed are able to exhibit surface cleaning, deodorizing, antimicrobial and other effects.

As used herein, the "dark place" refers to a state having an illuminance of less than 10 lx. The inventive dispersion is particularly effective in dark places where the UV irradiance is below 0.001 mW/cm$^2$.

EXAMPLES

The following Working Examples and Comparative Examples are provided to illustrate the invention, and are not intended to limit the scope thereof. In these Examples, the "starting antibacterial/antifungal metal compound" is sometimes abbreviated as "starting metal compound," the "photocatalyst/alloy fine-particle dispersion" is sometimes abbreviated as "photocatalyst fine-particle dispersion," and the "photocatalyst/alloy thin film" is sometimes abbreviated as "photocatalytic thin film."

The various measurements in this invention were carried out as described below.
(1) Test of Antibacterial Activity of Photocatalytic Thin Film (Dark Places, Under UV Irradiation)

The antibacterial performance of the photocatalytic thin film was evaluated based on the criteria shown below for a sample obtained by applying a photocatalytic thin film to a thickness of 100 nm onto a 50 mm square glass substrate. The test was carried out in accordance with the test method for hybrid photocatalytic flat panel products in JIS R 1702: 2012 (Fine Ceramics—Antibacterial Activity Test Method for and Antibacterial Efficacy of Photocatalytic Products).

Excellent (Exc): All antibacterial activity values are 4.0 or more

Good (Good): All antibacterial activity values are 2.0 or more

Poor (NG): Some antibacterial activity values are less than 2.0
(2) Test of Fungal Resistance of Photocatalytic Thin Film (Dark Places)

Using a sample obtained by applying a photocatalytic thin film to a thickness of 100 nm onto a 50 mm square glass substrate, the antifungal performance of the photocatalytic thin film was evaluated for up to 8 weeks following application by a method in accordance with JIS Z 2911:2010 (Method for Testing Fungal Resistance). Evaluation was carried out according to the following criteria by rating the state of fungal growth as set forth in Appendix A.

Excellent (Exc): Fungal growth state is from 0 to 1

Good: Fungal growth state is from 2 to 3

Poor (NG): Fungal growth state is from 4 to 5
(3) Test of Photocatalytic Performance in Decomposition of Acetaldehyde Gas (Under UV Irradiation)

The activity of a photocatalytic thin film produced by applying and drying the dispersion was evaluated by means of acetylene gas decomposing reactions. Evaluation was carried out as follows by a batch-type method for evaluating gas decomposition performance.

A sample obtained by forming a photocatalytic thin film to a thickness of 100 nm over the entire surface of an A4-size (210 mm×297 mm) PET film was set within a 5 L capacity stainless steel cell having a quartz glass window, following which the cell was filled with 20 ppm concentration acetaldehyde gas that was moisture-conditioned to 50% humidity, and the sample was exposed to light at an intensity of 1 mW/cm² with a UV lamp (model number: FL10BLB, from Toshiba Lighting & Technology Corporation) positioned at the top of the cell. When acetaldehyde gas decomposes on account of the photocatalyst on the thin film, the acetaldehyde gas concentration within the cell decreases. By measuring this concentration, it is possible to determine the amount of acetaldehyde gas that has decomposed. The acetaldehyde gas concentration was measured with a photoacoustic multigas monitor (INNOVA 1412, from LumaSense Technologies Inc.), and evaluation was carried out based on the following criteria by comparing the time it took for the concentration of acetaldehyde gas to decrease to 1 ppm from the initial concentration of 20 ppm. The test was performed for up to 5 hours.

Excellent (Exc): Decreased to reference value in 2 hours or less

Good: Decreased to reference value in 5 hours or less

Marginal: A decrease from initial concentration (20 ppm) is observable, but concentration could not decrease to reference value (1 ppm) within 5 hours Poor (NG): No decrease from initial concentration (20 ppm) is observable (no decrease whatsoever)

(4) Identification of Crystal Phases of Titanium Oxide Fine Particles

The crystal phases of the titanium oxide fine particles were identified by powder x-ray diffraction analysis (using the D2 PHASER desktop x-ray powder diffractometer from Broker AXS) of the titanium oxide fine-particle powders recovered by drying the titanium oxide fine-particle dispersions 105° C. for 3 hours.

(5) Transparency of Photocatalytic Thin Film

The haze (%) of the glass plate serving as the substrate was measured. The dispersion was then coated onto the glass and dried to form a photocatalytic thin film, and to the haze of the glass plate on which this thin film has been formed was measured. The haze of the photocatalytic thin film itself was determined from the difference between these two measurements. Haze measurements were carried out using the NDH-200 digital haze meter from Nippon Denshoku Industries Co., Ltd. The transparency of the photocatalytic thin film was rated according to the following criteria from the difference in the haze measurements obtained.

Excellent (Exc): The difference was +1% or less

Good: The difference was more than +1% and up to +3%

Poor (NG): The difference was more than +3%

(6) Determination of Alloy Presence in Alloy Fine Particles

An assessment as to whether an alloy is indeed present in the alloy fine particles was carried out by energy-dispersive X-ray spectroscopy under observation with a scanning transmission electron microscope (ARM-200F, from JEOL Ltd.). Specifically, the alloy fine particle dispersion was added dropwise onto a carbon grid for transmission electron microscopy and, after removing the moisture by drying, was examined under magnification. A number of fields containing several particles regarded as having average shapes were selected and STEM-EDX mapping was carried out. In cases where it was confirmed that each of the metal constituents making up the alloy are detected within a single particle, the particles were judged to be alloy fine particles.

Working Example 1

Preparation of Titanium Oxide Fine-Particle Dispersion

A titanium hydroxide precipitate was obtained by diluting a 36 wt % aqueous solution of titanium (IV) chloride ten-fold with pure water and then gradually adding 10 wt % ammonia water to effect neutralization and hydrolysis. The pH of the solution at this time was 9. The resulting precipitate was deionization treated by the repeated addition of pure water and decantation. Next, 35 wt % hydrogen peroxide water was added to the deionized titanium hydroxide precipitate to a molar ratio $H_2O_2/Ti$ of 5, after which the system was stirred for one day at room temperature to fully carry out the reaction, thereby giving a clear, yellow-colored peroxotitanic acid solution (a).

A 500 mL autoclave was charged with 400 ml of the peroxotitanic acid solution (a), and this was hydrothermally treated at 130° C. and 0.5 MPa for 90 minutes. The concentration was then adjusted by adding pure water, giving a titanium oxide fine-particle dispersion (A) (nonvolatiles concentration, 1 wt %).

The results of various measurements on the titanium oxide fine-particle dispersions obtained are collectively presented in Table 1.

Preparation of Silver-Copper Alloy Fine-Particle Dispersion

A starting metal compound-containing solution (I) was obtained by dissolving silver nitrate to a silver concentration of 2.50 mmol/L and copper nitrate dihydrate to a copper concentration of 2.50 mmol/L in ethylene glycol as the solvent. The starting metal compound-containing solutions obtained are collectively shown in Table 2.

A reducing agent-containing solution (i) was obtained by mixing together 55 wt % of ethylene glycol and 8 wt % of pure water as solvents, 2 wt % of potassium hydroxide as the basic substance, 20 wt % of hydrazine monohydrate and 5 wt % of dimethylaminoethanol as the reducing agents, and 10 wt % of polyvinylpyrrolidone as a reducing agent/protective agent.

An alloy fine-particle dispersion (α) was obtained by rapidly mixing 0.2 L of reducing agent-containing solution (i) having a temperature of 25° C. into 2 L of starting metal compound-containing solution (I) that was heated to 160°C. in a reactor, and subjecting the resulting mixture to concentration and pure-water washing with an ultrafiltration membrane having a molecular weight cutoff of 10,000 (Microza, from Asahi Kasei Corporation). The alloy fine-particle dispersions obtained are collectively shown in Table 3.

A photocatalyst fine-particle dispersion (E-1) according to the invention was obtained by mixing together the titanium oxide fine-particle dispersion (A) and the alloy fine-particle dispersion (α) in such a way that the weight ratio between the respective fine particles (titanium oxide fine particles/alloy fine particles) in the dispersion became 100. The starting metal compound-containing solutions obtained are collectively shown in Table 4.

A liquid coating for evaluation was prepared by adding a silica-based binder (colloidal silica available under the trade name Snotex 20 from Nissan Chemical Industries Co., Ltd.; average particle size, 10 to 20 nm; an aqueous solution having a $SiO_2$ concentration of 20 wt %) to the photocatalyst fine-particle dispersion (E-1) such that the weight ratio $TiO_2/SiO_2$ became 1.5.

The liquid coating for evaluation was coated onto PET film so as to give a photocatalytic thin-film thickness of 100 nm, and dried for one hour in an oven set to 80° C., thereby giving a sample for evaluation. Various tests were carried out on the sample.

Evaluation results for the antibacterial test and antifungal test are presented in Table 5, and results for the acetaldehyde gas decomposition test and photocatalytic thin-film transparency are presented in Table 6.

Working Example 2

Preparation of Titanium Oxide Fine-Particle Dispersion

Aside from the adding and dissolving tin (IV) chloride in a 36 wt % aqueous titanium (IV) oxide solution so that Ti/Sn (molar ratio) became 20, a clear, yellow-colored peroxotitanic acid solution (b) was obtained in the same way as in Working Example 1.

A 500 mL autoclave was charged with 400 mL of the peroxotitanic acid solution (b), and this was hydrothermally treated at 150° C. far 90 minutes. The concentration was then adjusted by adding pure water, thereby giving a titanium oxide fine-particle dispersion (B) (nonvolatiles concentration, 1.0 wt %).

Preparation of Silver-Copper Alloy Fine-Particle Dispersion

Aside from using a starting metal compound-containing solution (II) obtained by dissolving silver nitrate to a silver concentration of 4.50 mmol/L and copper nitrate dihydrate to a copper concentration of 0.50 mmol/L in ethylene glycol as the solvent, an alloy fine-particle dispersion (β) was obtained in the same way as in Working Example 1.

The titanium oxide fine-particle dispersion (B) and the alloy fine-particle dispersion (β) were mixed together such that the weight ratio of fine particles in the respective dispersions (titanium oxide fine particles/alloy fine particles) became 800, thereby giving a photocatalytic fine-particle dispersion (E-2) according to the invention.

Evaluation samples were produced and various evaluations were carried out in the same way as in Working Example 1.

Working Example 3

Preparation of Silver-Palladium Alloy Fine-Particle Dispersion

Aside from using a starting metal compound-containing solution (III) obtained by dissolving silver nitrate to a silver concentration of 4.00 mmol/L and palladium nitrate dihydrate to a palladium concentration of 1.00 mmol/L in pure water as the solvent, an alloy fine-particle dispersion (γ) was obtained in the same way as in Working Example 1.

The titanium oxide fine-particle dispersion (A) and the alloy fine-particle dispersion (γ) were mixed together such that the weight ratio of fine particles in the respective dispersions (titanium oxide fine particles/alloy fine particles) became 200, thereby giving a photocatalytic fine-particle dispersion (E-3) according to the invention.

Evaluation samples were produced and various evaluations were carried out in the same way as in Working Example 1.

Working Example 4

Preparation of Silver-Platinum Alloy Fine-Particle Dispersion

Aside from using a starting metal compound-containing solution (IV) obtained by dissolving silver nitrate to a silver concentration of 4.00 mmol/L and chloroplatinic acid hexahydrate to a platinum concentration of 1.00 mmol/L in ethylene glycol as the solvent, an alloy fine-particle dispersion (δ) was obtained in the same way as in Working Example 1.

The titanium oxide fine-particle dispersion (A) and the alloy fine-particle dispersion (δ) were mixed together such that the weight ratio of fine particles in the respective dispersions (titanium oxide fine particles/alloy fine particles) became 1,000, thereby giving a photocatalytic fine-particle dispersion (E-4) according to the invention.

Evaluation samples were produced and various evaluations were carried out in the same way as in Working Example 1.

Working Example 5

Preparation of Copper-Zinc Alloy Fine-Particle Dispersion

Aside from using a starting metal compound-containing solution (V) obtained by dissolving copper nitrate trihydrate to a copper concentration of 3.75 mmol/L and zinc chloride hexahydrate to a zinc concentration of 1.25 mmol/L in ethylene glycol as the solvent, an alloy fine-particle dispersion (ε) was obtained in the same way as in Working Example 1.

The titanium oxide fine-particle dispersion (A) and the alloy fine-particle dispersion (ε) were mixed together such that the weight ratio of fine particles in the respective dispersions (titanium oxide fine particles alloy fine particles) became 300, thereby giving a photocatalytic fine-particle dispersion (E-5) according to the invention.

Evaluation samples were produced and various evaluations were carried out in the same way as in Working Example 1.

Working Example 6

Preparation of Silver-Zinc Alloy Fine-Particle Dispersion

Aside from using a starting metal compound-containing solution (VI) obtained by dissolving silver nitrate to a silver concentration of 3.75 mmol/L and zinc nitrate hexahydrate to a zinc concentration of 1.25 mmol/L in ethylene glycol as the solvent, an alloy fine-particle dispersion (ζ) was obtained in the same way as in Working Example 1.

The titanium oxide fine-particle dispersion (A) and the alloy fine-particle dispersion (ζ) were mixed together such that the weight ratio of fine particles in the respective dispersions (titanium oxide fine particles alloy fine particles) became 300, thereby giving a photocatalytic fine-particle dispersion (E-6) according to the invention.

Evaluation samples were produced and various evaluations were carried out in the same way as in Working Example 1.

Working Example 7

Preparation of Zinc-Magnesium Alloy Fine-Particle Dispersion

Aside from using a starting metal compound-containing solution (VII) obtained by dissolving zinc nitrate hexahydrate to a zinc concentration of 3.75 mmol/L and magnesium nitrate hexahydrate to a magnesium concentration of 1.25 mmol/L in ethylene glycol as the solvent, an alloy fine-particle dispersion (η) was obtained in the same way as in Working Example 1.

The titanium oxide fine-particle dispersion (A) and the alloy fine-particle dispersion (η) were mixed together such that the weight ratio of fine particles in the respective dispersions (titanium oxide fine particles/alloy fine particles) became 300, thereby giving a photocatalytic fine-particle dispersion (E-7) according to the invention, Evaluation samples were produced and various evaluations were carried out in the same way as in Working Example 1.

Working Example 8

Preparation of Silver-Copper Alloy Fine-Particle Dispersion

Aside from Changing the concentration/pure-water washing proportions with an ultrafiltration membrane having a molecular weight cutoff of 10,000 (Microza, Asahi Kasei Corporation), an alloy fine particle dispersion (θ) was obtained in the same way as in Working Example 1.

The titanium oxide fine-particle dispersion (A) and the alloy fine-particle dispersion (θ) were mixed together such that the weight ratio of fine particles in the respective dispersions (titanium oxide fine particles/alloy fine particles) became 100, thereby giving a photocatalytic fine-particle dispersion (E-8) according to the invention.

Evaluation samples were produced and various evaluations were carried out in the same way as in Working Example 1.

Working Example 9

The titanium oxide fine-particle dispersion (A) and the alloy fine-particle dispersion (α) were mixed together in such a way that the weight ratio between the fine particles in the respective dispersion (photocatalytic titanium oxide fine particles/alloy fine particles) became 5,000, thereby giving a photocatalytic fine-particle dispersion (E-9) according to the invention.

Evaluation samples were produced and various evaluations were carried out in the same way as in Working Example 1.

Working Example 10

Preparation of Silver-Tin Alloy Fine-Particle Dispersion

Aside from using a starting metal compound-containing solution (IX) obtained by dissolving silver nitrate to a silver concentration of 1.50 mmol/L and tin chloride to a tin concentration of 3.5 mmol/L in ethylene glycol as the solvent, an alloy fine-particle dispersion (ι) was obtained in the same way as in Working Example 1.

The titanium oxide fine-particle dispersion (A) and the alloy fine-particle dispersion (ι) were mixed together such that the weight ratio of fine particles in the respective dispersions (titanium oxide fine particles/alloy fine particles) became 100, thereby giving a photocatalytic fine-particle dispersion (E-10) according to the invention.

Evaluation samples were produced and various evaluations were carried out in the same way as in Working Example 1.

Comparative Example 1

A titanium oxide fine-particle dispersion (C-1) was obtained from the titanium oxide fine-particle dispersion (A) alone.

A liquid coating for evaluation was prepared by adding a silica-based binder (colloidal silica available under the trade name Snotex 20 from Nissan Chemical Industries Co., Ltd.; average particle size, 10 to 20 nm; an aqueous solution having a $SiO_2$ concentration of 20 wt %) to the photocatalytic fine-particle dispersion (C-1) so as to give a weight ratio $TiO_2/SiO_2$ of 1.5.

The liquid coating for evaluation was coated onto PET film so as to give a photocatalytic thin film thickness of 100 nm, and dried for 1 hour in an oven set to 80° C., thereby giving a sample for evaluation. The sample was subjected to various evaluations.

Comparative Example 2

An alloy fine particle dispersion (C-2) was obtained from the alloy fine-particle dispersion (α) alone.

Evaluation samples were produced and various evaluations were carried out in the same way as Working Example 1.

Comparative Example 3

Preparation of Silver Fine-Particle Dispersion

A starting metal compound-containing solution (X) was obtained by dissolving silver nitrate to a silver concentration of 4.00 mmol/L in ethylene glycol as the solvent.

Aside from using the starting metal compound-containing solution (X), a silver fine-particle dispersion (κ) was obtained in the same way as in Working Example 1.

The titanium oxide fine-particle dispersion (A) and the silver fine-particle dispersion (κ) were mixed together such that the weight ratio of tine particles in the respective dispersions (titanium oxide fine particles/silver fine particles) became 300, thereby giving a photocatalytic fine-particle dispersion (C-3).

Evaluation samples were produced and various evaluations were carried out in the same way as in Working Example 1.

Comparative Example 4

Preparation of Starting Silver Solution

A starting silver compound-containing solution (XI) was obtained by dissolving silver nitrate to a silver concentration of 4.00 mmol/L in pure water as the solvent.

The titanium oxide fine-particle dispersion (A) and the starting silver compound-containing solution (XI) were mixed together such that the weight ratio of fine particles in the respective dispersions (titanium oxide fine particles/silver constituent) became 300, thereby giving as photocatalytic fine-particle dispersion (C-4).

Evaluation samples were produced and various evaluations were carried out in the same way as in Working Example 1.

As is apparent from Comparative Example 1, in dark places, a titanium oxide fine-particle dispersion by itself does not exhibit an antibacterial activity and has a weak antifungal activity.

As is apparent from Comparative Example 2, an alloy fine powder dispersion by itself has a weak antifungal activity and does not manifest an acetaldehyde gas-decomposing activity under exposure of light.

As is apparent from Comparative Example 3, a photocatalytic dispersion containing a mixture of titanium oxide fine particles and silver fine particles has a weak antifungal activity and a weak acetaldehyde gas-decomposing performance.

As is apparent from Comparative Example 4, when a silver solution was added to titanium oxide fine particles, the particle size in the photocatalytic dispersion increased, resulting in a decline in transparency, in addition to which the antifungal activity and the acetaldehyde gas-decomposing performance were weak.

TABLE 1

| Titanium oxide fine-particle dispersion | Nonvolatiles concentration (wt %) | Average particle size $D_{50}$ (nm) | Crystal phase |
|---|---|---|---|
| (A) | 1.0 | 12 | anatase |
| (B) | 1.0 | 9 | rutile |

TABLE 2

| Starting metal compound-containing solution | Solvent 1 | Alloy constituent 1 | Concentration (mmol/L) | Alloy constituent 2 | Concentration (mmol/L) | Antibacterial/antifungal metal ratio (%) |
|---|---|---|---|---|---|---|
| (I) | ethylene glycol | $AgNO_3$ | 2.50 | $Cu(NO_3)_2 \cdot 3H_2O$ | 2.50 | 100 |
| (II) | ethylene glycol | $AgNO_3$ | 4.50 | $Cu(NO_3)_2 \cdot 3H_2O$ | 0.50 | 100 |
| (III) | pure water | $AgNO_3$ | 4.00 | $Pd(NO_3)_2 \cdot 2H_2O$ | 1.00 | 100 |
| (IV) | ethylene glycol | $AgNO_3$ | 4.00 | $H_2[PtCl_6] \cdot 6H_2O$ | 1.00 | 80 |
| (V) | ethylene glycol | $Cu(NO_3)_2 \cdot 2H_2O$ | 3.75 | $Zn(NO_3)_2 \cdot 6H_2O$ | 1.25 | 100 |
| (VI) | ethylene glycol | $AgNO_3$ | 3.75 | $Zn(NO_3)_2 \cdot 6H_2O$ | 1.25 | 100 |
| (VII) | ethylene glycol | $Zn(NO_3)_2 \cdot 6H_2O$ | 3.75 | $Mg(NO_3)_2 \cdot 6H_2O$ | 1.25 | 75 |
| (IX) | ethylene glycol | $AgNO_3$ | 1.50 | $SnCl_2$ | 3.50 | 30 |
| (X) | ethylene glycol | $AgNO_3$ | 4.00 | — | — | 100 |
| (XI) | pure water | $AgNO_3$ | 4.00 | — | — | 100 |

TABLE 3

| Alloy fine-particle dispersion | Nonvolatiles content (wt %) | Alloy fine particles (wt %) | Alloy fine particles/nonvolatile impurities | Average particle size $D_{50}$ (nm) |
|---|---|---|---|---|
| (α) | 0.70 | 0.20 | 0.40 | 60 |
| (β) | 0.71 | 0.12 | 0.20 | 35 |
| (γ) | 0.65 | 0.10 | 0.18 | 53 |
| (δ) | 1.00 | 0.30 | 0.43 | 60 |
| (ε) | 0.60 | 0.08 | 0.15 | 49 |
| (ζ) | 0.60 | 0.08 | 0.15 | 45 |
| (η) | 0.60 | 0.08 | 0.15 | 68 |
| (θ) | 0.70 | 0.05 | 0.08 | 30 |
| (ι) | 0.70 | 0.15 | 0.27 | 61 |
| (κ) | 0.70 | 0.10 | 0.17 | 75 |

TABLE 4

| Photocatalyst/alloy fine-particle dispersion | Titanium oxide fine-particle dispersion | Alloy fine-particle dispersion | Titanium oxide fine particles/alloy fine particles | Nonvolatiles concentration (%) | Average particle size $D_{50}$ (nm) |
|---|---|---|---|---|---|
| (E-1) | (A) | (α) | 100 | 1.0 | 18 |
| (E-2) | (B) | (β) | 800 | 1.0 | 14 |
| (E-3) | (A) | (γ) | 200 | 1.0 | 16 |
| (E-4) | (A) | (δ) | 1,000 | 1.0 | 17 |
| (E-5) | (A) | (ε) | 300 | 1.0 | 16 |
| (E-6) | (A) | (ζ) | 300 | 1.0 | 16 |
| (E-7) | (A) | (η) | 300 | 1.0 | 19 |

TABLE 4-continued

| Photocatalyst/ alloy fine-particle dispersion | Titanium oxide fine-particle dispersion | Alloy fine-particle dispersion | Titanium oxide fine particles/ alloy fine particles | Nonvolatiles concentration (%) | Average particle size $D_{50}$ (nm) |
|---|---|---|---|---|---|
| (E-8) | (A) | (θ) | 100 | 0.8 | 15 |
| (E-9) | (A) | (α) | 5,000 | 1.0 | 15 |
| (E-10) | (A) | (ι) | 100 | 0.9 | 18 |
| (C-1) | (A) | — | — | 1.0 | 12 |
| (C-2) | — | (α) | — | 0.7 | 60 |
| (C-3) | (A) | (κ) | 300 | 1.0 | 22 |
| (C-4) | (A) | (XI) | 300 | 0.9 | 56 |

TABLE 5

| | | Test of antibacterial performance | | | | Test of antifungal performance | | | |
|---|---|---|---|---|---|---|---|---|---|
| | | Antibacterial activity (dark places) | | Antibacterial activity (UV irradiation) | | | Fungal growth state (4 weeks) | | Fungal growth state (8 weeks) | |
| | | *Escherichia coli* | *Staphylococcus aureus* | *Escherichia coli* | *Staphylococcus aureus* | Evaluation | | Evaluation | | Evaluation |
| Working Example | 1 | 5.2 | 4.6 | 5.2 | 5.0 | Exc | 0 | Exc | 1 | Exc |
| | 2 | 4.8 | 4.3 | 5.0 | 4.9 | Exc | 1 | Exc | 1 | Exc |
| | 3 | 5.0 | 4.5 | 5.1 | 4.8 | Exc | 0 | Exc | 1 | Exc |
| | 4 | 4.3 | 3.7 | 5.0 | 4.7 | good | 2 | good | 2 | good |
| | 5 | 4.5 | 4.0 | 5.0 | 5.0 | Exc | 1 | Exc | 2 | good |
| | 6 | 4.6 | 4.1 | 5.0 | 4.9 | Exc | 1 | Exc | 2 | good |
| | 7 | 4.1 | 3.6 | 5.0 | 4.8 | Exc | 2 | good | 2 | good |
| | 8 | 3.9 | 3.3 | 4.5 | 4.2 | good | 2 | good | 3 | good |
| | 9 | 3.3 | 2.7 | 5.0 | 4.8 | good | 3 | good | 3 | good |
| | 10 | 3.6 | 3.1 | 5.0 | 4.9 | good | 2 | good | 3 | good |
| Comparative Example | 1 | 0.0 | 0.0 | 5.0 | 4.8 | NG | 4 | NG | 5 | NG |
| | 2 | 5.1 | 4.6 | 5.0 | 4.5 | Exc | 3 | good | 4 | NG |
| | 3 | 3.9 | 2.4 | 5.0 | 4.5 | good | 3 | good | 4 | NG |
| | 4 | 4.1 | 2.6 | 4.5 | 3.8 | good | 4 | NG | 4 | NG |

TABLE 6

| | | Acetaldehyde gas decomposition test | | Transparency of photocatalytic thin film | |
|---|---|---|---|---|---|
| | | Time (hours) | Evaluation | Haze (%) | Evaluation |
| Working Example | 1 | 1.0 | Exc | 0.4 | good |
| | 2 | 2.2 | good | 0.2 | good |
| | 3 | 1.2 | Exc | 0.3 | good |
| | 4 | 1.6 | Exc | 0.3 | good |
| | 5 | 1.8 | Exc | 0.3 | good |
| | 6 | 2.7 | good | 0.3 | good |
| | 7 | 2.8 | good | 0.5 | good |
| | 8 | 3.7 | good | 0.2 | good |
| | 9 | 2.5 | good | 0.2 | good |
| | 10 | 2.6 | good | 0.3 | good |
| Comparative Example | 1 | 3.0 | Exc | 0.1 | good |
| | 2 | no decrease in concentration | NG | 2.4 | marginal |
| | 3 | 7.5 | marginal | 1.1 | marginal |
| | 4 | 8.0 | marginal | 4.1 | NG |

Japanese Patent Application No. 2017-190061 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A photocatalyst/alloy fine-particle dispersion comprising the following two kinds of fine particles dispersed in an aqueous dispersion medium:
   (i) photocatalyst fine particles, and
   (ii) alloy fine particles containing an antibacterial/antifungal metal.

2. The dispersion of claim 1, wherein the photocatalyst fine particles (i) are titanium oxide fine particles.

3. The dispersion of claim 1 wherein the antibacterial/antifungal metal contained in the alloy fine particles (ii) is at least one metal selected from the group consisting of silver, copper and zinc.

4. The dispersion of claim 3, wherein the antibacterial/antifungal metal contained in the alloy fine particles (ii) includes at least silver.

5. The dispersion of claim 1, wherein the amount of antibacterial/antifungal metal contained in the alloy fine particles (ii) is from 1 to 100 wt % based on the total weight of the alloy fine particles.

6. The dispersion of claim 1, wherein the photocatalyst fine particles (i) and the antibacterial/antifungal metal-containing alloy fine particles (ii) have a volume-based 50% cumulative distribution size ($D_{50}$), as measured by dynamic laser light scattering, of from 5 to 100 nm.

7. The dispersion of claim 1, further comprising a binder.

8. The dispersion of claim 7, wherein the binder is a silicon compound-based binder.

9. A member having on a surface thereof a photocatalyst/alloy thin film formed by using the photocatalyst/alloy fine-particle dispersion of claim 1.

10. A method for preparing a photocatalyst/alloy fine-particle dispersion, comprising the steps of:
  (1) preparing a peroxotitanic acid solution from a starting titanium compound, a basic substance, hydrogen peroxide and an aqueous dispersion medium;
  (2) preparing a titanium oxide fine-particle dispersion by heating the peroxotitanic acid solution prepared in Step (1) at between 80 and 250° C. under pressure control;
  (3) preparing a solution containing a starting antibacterial/antifungal metal compound and a solution containing a reducing agent for reducing the starting metal compound;
  (4) preparing an alloy fine-particle dispersion by mixing together the solution containing a starting antibacterial/antifungal metal compound and the solution containing a reducing agent for reducing the starting metal compound that were prepared in Step (3);
  (5) washing the alloy fine-particle dispersion prepared in Step (4) with an aqueous dispersion medium by membrane filtration method; and
  (6) mixing together the titanium oxide fine-particle dispersion and the alloy fine-particle dispersion obtained in Steps (2) and (5).

* * * * *